United States Patent [19]

Arnold

[11] Patent Number: 4,935,154

[45] Date of Patent: Jun. 19, 1990

[54] WATER TREATING USING A SERIES COALESCING FLUME

[76] Inventor: Kenneth E. Arnold, 3031 Shadowdale, Houston, Tex. 77043

[21] Appl. No.: 15,293

[22] Filed: Feb. 17, 1987

Related U.S. Application Data

[63] Continuation-in-part of Ser. No. 601,434, Apr. 18, 1984, abandoned.

[51] Int. Cl.[5] .............................................. B01D 17/028

[52] U.S. Cl. .................................... 210/787; 210/801; 252/349

[58] Field of Search ............... 210/799, 801, 807, 708, 210/787–789, 521, 294; 252/328, 349, 358

[56] References Cited

U.S. PATENT DOCUMENTS

| | | | |
|---|---|---|---|
| 748,981 | 1/1904 | Oliver | 210/540 |
| 1,864,511 | 6/1932 | Jones | 210/801 |
| 2,252,959 | 8/1941 | Blair, Jr. | 252/348 |
| 2,698,303 | 12/1954 | Blair, Jr. et al. | 252/349 |
| 2,846,073 | 8/1958 | Hopper | 210/540 |
| 3,527,348 | 9/1970 | Lalonde et al. | 210/540 X |
| 3,529,728 | 9/1970 | Middelbeek et al. | 210/540 X |
| 3,893,918 | 7/1975 | Favret, Jr. | 210/84 |
| 3,914,175 | 10/1975 | Kunz et al. | 210/802 |
| 3,971,719 | 7/1976 | Peters | 210/540 X |
| 4,048,069 | 9/1977 | Cuvillier et al. | 210/801 |
| 4,049,553 | 9/1977 | Stebbins et al. | 210/540 X |
| 4,278,545 | 7/1981 | Batutis et al. | 210/521 |
| 4,333,835 | 6/1982 | Lynch | 210/522 X |
| 4,356,086 | 10/1982 | Oberg | 210/923 X |
| 4,357,241 | 11/1982 | Knudson et al. | 210/802 X |
| 4,359,329 | 11/1982 | Willeitner | 210/DIG. 5 |
| 4,388,357 | 6/1983 | Luebke | 210/170 X |
| 4,479,875 | 10/1984 | Nelson | 210/DIG. 5 |
| 4,483,774 | 11/1984 | Brill et al. | 210/540 X |
| 4,501,664 | 2/1985 | Heil et al. | 210/220 X |
| 4,643,834 | 2/1987 | Batutis | 210/802 X |
| 4,689,158 | 8/1987 | Tulkki | 210/802 |

OTHER PUBLICATIONS

Arnold, Kenneth E. & Stewart, Maurice, Jr., "Designing Oil and Gas Production Systems (I and II)," *World Oil,* Mar., 1985 (pp. 69–78) and May, 1985 (pp. 91–98).

Karabelas, A. J., "Droplet Size Spectra Generated in Turbulent Pipe Flow of Dilute Liquid/Liquid Dispersions," *AICHE Journal,* Mar., 1978, pp. 170–179.

Hinze, J. O., "Fundamentals of the Hydrodynamic Mechanism of Splitting in Dispersion Processes," *AICHE Journal,* Sep., 1955, pp. 289–295.

*Primary Examiner*—Tom Wyse

*Attorney, Agent, or Firm*—Paul F. Simpson

[57] ABSTRACT

A method and apparatus for removing oil from the produced water that is associated with the production of hydrocarbons. The method consists of providing a plurality of serially connected individual compartments with each compartment connected to the next compartment by a flow path that induces the oil droplets to coalesce. The method may also include the use of parallel plate coalescers and gas flotation devices to aid in treating.

15 Claims, 5 Drawing Sheets

WATER TREATING USING A SERIES COALESCING FLUME

CROSS-REFERENCE TO RELATED APPLICATIONS

The present application is a continuation-in-part of application Ser. No. 601,434, filed Apr. 18, 1984, by Kenneth Edward Arnold, and now abandoned.

BACKGROUND OF THE INVENTION

The present invention relates to the removal of foreign material from water before such water is discharged to its original source or to another location. In particular, the invention relates to the cleanup of hydrocarbons in water that is produced with crude oil before the produced water is discharged to a disposal area.

Attempts to meet discharge criteria by providing retention time with large tanks or flumes have not been successful. Discharge criteria are generally set by regulatory bodies, such as the Environmental Protection Agency ("EPA") or various state authorities. A widely-recognized standard, promulgated by the EPA for the Gulf of Mexico, allows a minimum of seventy-two (72) milligrams of oil per liter (mg/l, generally equivalent to parts per million, or "ppm") of the discharged fluid mixture, and requires a monthly average of not over 48 mg/l (ppm). These standards are somewhat stringent in the context of general oil field production operations. To meet such criteria it is necessary to remove drops of oil on the order of 25 microns in diameter or smaller. Tanks and flumes with theoretical retention times large enough to accomplish this are subjected to severe short circuiting due to temperature and density difference. Previously, this has been overcome by the installation of several pieces of equipment each with its associated controls and shut-down sensors as required. These pieces of equipment include, for example, settling tanks, parallel plate interceptors, and gas flotation units.

In offshore fields the space available on an offshore producing platform is limited; thus, the area that is occupied by the several pieces of water cleanup equipment limits the amount of space available for other activities on the platform. In addition, the problem exists in many onshore oil fields where the ratio between the oil and water decreases with the age of the field, and thus the quantity of produced water that must be disposed of increases as the field ages. In the past the waters produced in these fields may have been disposed of in injection wells after being treated in large tanks, flumes, or settling ponds. With increasing water production these tanks are no longer capable of treating the water.

BRIEF SUMMARY OF THE INVENTION

The present invention solves the problems inherent in the prior art by providing a method and/or a unitary structure that will remove the oil from produced waters so that the oil content of the oil-water mixture in the final stages is low enough to meet discharge criteria and thereby allows the mixture to be injected into a geologic formation or discharged into surrounding waters. The present invention improves the settling process by providing turbulent coalescence in enclosed conduit coalescers disposed between individual separating compartments to increase the size of the oil droplets in the water as the oil-water mixture flows from one separating compartment to the next. By increasing the size of the droplets additional oil can be removed from the oil-water mixture in the subsequent separating compartment, or oil can be removed from the oil-water mixture in each separating compartment in a shorter time period.

One embodiment of the invention comprises a flume which may be a tank-like structure, a concrete structure, an open pit-like structure, or any other flow channel that could be considered a flume by those skilled in the art. The flume is divided into separate compartments so that the oil can be removed from the produced water in various stages, if necessary, to satisfy discharge criteria. The oil can separate from the water by gravity settling, for example, providing sufficient time is provided in each settling tank. Of course, the size of the oil droplets also determines the time required for the oil to separate from water by gravity settling.

It is thus possible with the present invention to reduce the overall size of a flume considerably for treating a specified flow of a given oil-water mixture, or to reduce the oil content in the oil-water mixture discharged from a flume of a given size.

The present invention will, for example, allow existing devices used for water treating on onshore locations to be modified for higher flow rates. On an offshore location, for example, the present invention will allow sufficient water treating to take place in one piece of equipment with only one set of controls and shutdown sensors to maintain. The space required is much less than that required by several individual pieces of equipment as dictated by the prior art.

In many offshore installations it would be possible to build the series coalescing flume of the present invention directly in the hull of a floating barge or into a barge fabricated onshore and floated to its final destination and sunk on bottom. The barge may serve to support additional equipment necessary for producing and treating hydrocarbons. In such an installation the water treating would occur in the hull, space which would otherwise be of little use. This would reduce the amount of elevated platform space otherwise required. In many onshore locations the compartments could be created by the appropriate interconnection of lined pits.

To ensure that additional oil is removed to reduce the oil content of the oil-water mixture to lower levels, it may be necessary to include parallel plate interceptors in one of the separating compartments. The parallel plate interceptors capture small droplets of oil on plate surfaces to help remove them from the oil-water mixture. The effluent quality of the series coalescing flume can be further improved by providing induced or dissolved gas flotation devices in one of the separating compartments, or by a combination of parallel plate interceptors in one compartment followed by gas flotation devices in another compartment.

BRIEF DESCRIPTION OF THE DRAWINGS

The present invention will be more easily understood from the following description when taken in conjunction with the attached drawings in which.

DESCRIPTION OF PREFERRED EMBODIMENTS

Figure 8:
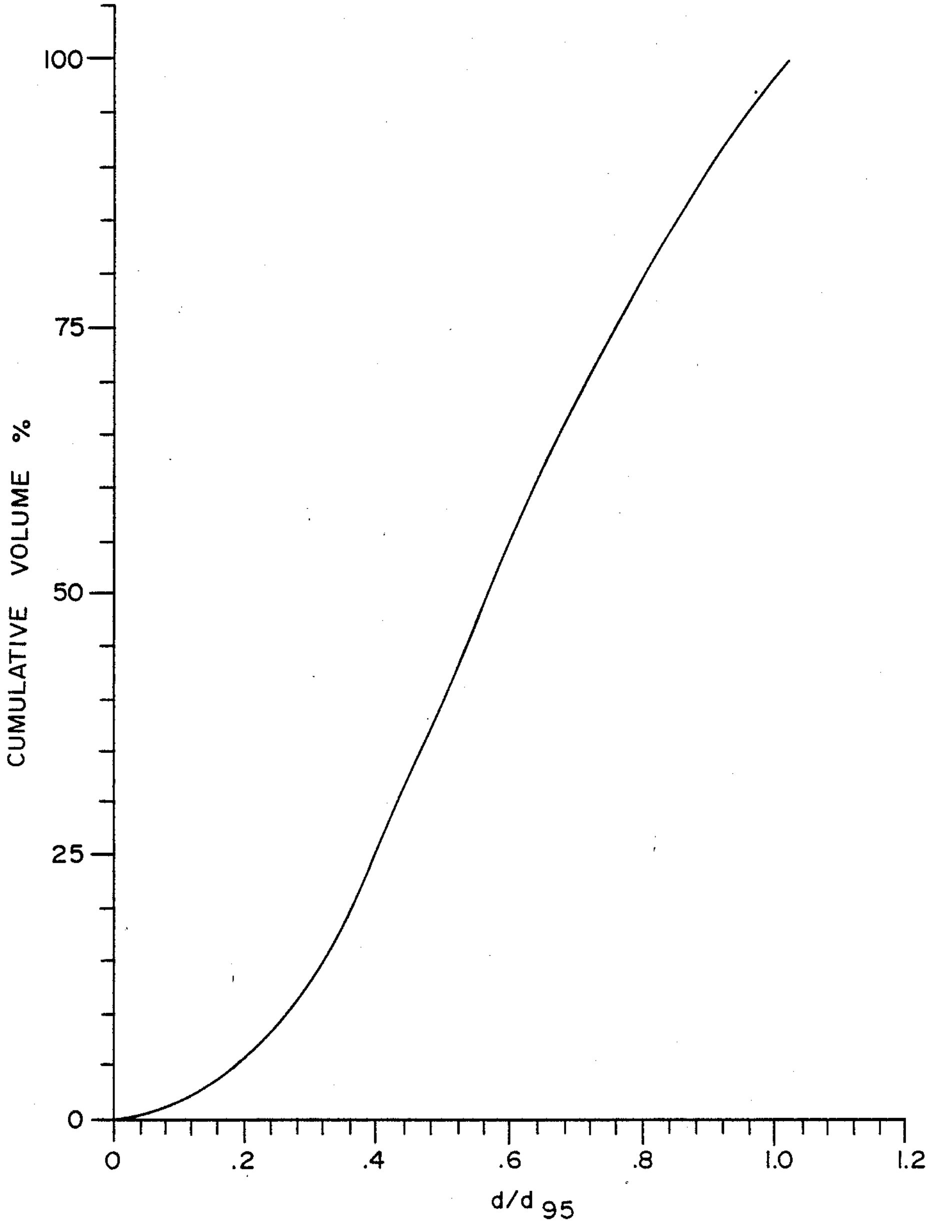
FIG. 8 shows a graph characterizing the distribution of diameter sizes of suspended oil droplets in produced water.

The present invention can be applied to any elongated flume that can be subdivided into separate compartments. Produced water entering the flume has a certain concentration of oil suspended in it in droplets of varying diameters, constituting a flowing oil-water mixture. The droplet size distribution is characterized by FIG. 8. The time it takes for a droplet of oil to grow in size in a deep bed gravity settler is given by the following (Equation 1):

$$t = \frac{(d^j - d_{oi}^j)}{6 f_v K_s}$$

where:

$d_{oi}$=initial droplet size;

d=final droplet size;

$f_v$=volume fraction of the dispersed phase;

$K_s$=empirical constant for the particular system; and j=an empirical constant always greater than 3, and dependent on the probability that the droplets will "bounce" apart before coalescence takes place.

Since j is large, after a short initial period, increases in retention time do not appreciably increase the droplet size to be separated. From Stoke's Law it is possible to calculate the minimum size oil droplets which can be captured at the apparent oil/water interface in the settler. Substantially all other droplets can be expected to leave the settler with the remaining oil-water mixture.

According to the present invention, the flow between each gravity settler section is by means of an enclosed conduit, configured in one embodiment as a tortuous path of coalescing pipes. It has been shown that the turbulence in such conduit-enclosed flow will aid in coalescence until a certain maximum droplet size is reached. This is given by the following (Equation 2):

$$d_{95} = 0.725 \frac{1}{\epsilon^{2/5}} \left(\frac{\sigma}{\rho w}\right)^{3/5} \times 10^4$$

where:

$d_{95}$=diameter of droplet above which size only substantially 5% of the oil:volume within the mixture is contained, microns;

$\epsilon$=mixing parameter, equivalent to the work done on a fluid per unit mass per unit time, $cm^2/s$ ; for turbulent flow, as is well known in the art, the mixing parameter is a function of the ratio of pressure drop to the retention time for which such pressure drop is calculated;

$\sigma$=surface tension of the mixture, dynes/cm; and $\rho_w$=density of the mixture, $g/cm^3$.

Additional discussion of Equations 1 and 2 can be found, for example, in Hinze, J. O., "Fundamentals of the Hydrodynamic Mechanism of Splitting in Dispersion Processes," *AIChE Journal*, September, 1955, pp. 289-95; Karabelas, A. J., "Droplet Size Spectra Generated in Turbulent Pipe Flow of Dilute Liquid/Liquid Dispersions," *AIChE Journal*, March, 1978, pp. 170-79; and in Applicant's paper, "Design Concepts for Offshore Produced-Water Treating and Disposal Systems," *Journal of Petroleum Technology*, February, 1983, pp. 276-83.

The parameters of the above equations, generally known to those skilled in the art, can be easily analyzed to understand how the present invention provides a ready method and a simple, yet efficient, apparatus for successive coalescence and separation of oil droplets suspended within an oil-water mixture to achieve a desired level of oil concentration. For a typically encountered application, for example, the physical parameters of the mixture to be treated are already set, i.e., the surface tension and the density. In addition, the flow rate is predetermined, dictated by the treating conditions in which the present invention is to be applied. Inlet conditions are thus usually set. Design outlet conditions, in particular the desired droplet size distribution, will hinge on the expected outlet separating capacity. Accordingly, the usual primary design factor for sizing the enclosed conduit path will be the desired droplet diameter distribution, characterized by $d_{95}$ and calculated in accordance with Equation 2.

One skilled in the art can readily manipulate Equation 2 so that, given values for density and surface tension, and for a particular desired droplet diameter distribution, the required mixing parameter can be calculated. As noted in the definition for the mixing parameter, and as well known to those skilled in the art, the mixing parameter is a function of the ratio of pressure drop to the retention time for which such pressure drop is calculated. As is also well known in the art of fluid flow, the pressure drop and retention time in turn are both themselves functions of three other variables' the flow rate, the flow diameter, and the flow length of the path. The ratio of pressure drop to retention time is independent of flow length, however, since both pressure drop and retention time are directly proportional to flow length.

As will be evident to those skilled in the art, coalescence in the conduit path will be dependent on both the flowing time and the degree of turbulence, and the time (hence, the flow length) required to develop a desired droplet size distribution must be considered to arrive at a properly configured path to achieve the desired coalescence. Thus, by properly sizing the path between sections it is possible to cause coalescence to a droplet size distribution approaching that of the inlet of the first section, or to any other droplet size as desired for efficient subsequent separation.

Applicant has determined that coalescing results are best obtained when the flow length is at least between approximately 100 and 140 times longer than the flow diameter. Accordingly, a required value for flow diameter of the path will determine the minimum flow length necessary to achieve a desired droplet size distribution in the flowing mixture exiting the path. Applicant has further discovered that the minimum desirable Reynolds number of the mixture flowing through the enclosed conduit should be substantially 50,000, although values as low as approximately 48,000 have been found to produce coalescence adequate for the purposes of the present invention.

The resulting residence time of the mixture flowing through a coalescing path according to such parameters is quite low. Applicant has calculated the following relationship for residence time as a function of flow diameter, when the flow length is 100 times longer than the flow diameter, and the Reynolds number for the flowing mixture equals 50,000:

$$t_r = 0.011 \times d^2$$

where:

$t_r$ = residence time, minutes; and d = flow diameter, inches.

Accordingly, for some commonly used flow diameter sizes, it can be seen that the residence time between settling sections can be on the order of seconds of time, yet still provide sufficient coalescence for the purposes of the present invention:

| d, inches | $t_r$, minutes | $t_r$, seconds |
|---|---|---|
| 2 | 0.04 | 3 |
| 3 | 0.10 | 6 |
| 4 | 0.18 | 11 |
| 6 | 0.40 | 24 |
| 8 | 0.70 | 42 |
| 10 | 1.10 | 66 |
| 12 | 1.58 | 95 |

To design a flow path for a specific mixture flowing at a predetermined flow rate, based on the anticipated subsequent separating conditions, a desired droplet diameter distribution is chosen, characterized by a required minimum value for $d_{95}$. Using Equation 2, with the known physical characteristics of the mixture, the maximum allowable mixing parameter can then be calculated. Having calculated the maximum allowable mixing parameter, the minimum allowable flow diameter can be determined as a function of the predetermined flow rate. A maximum allowable flow diameter can then be calculated that will yield a Reynolds number equal to at least substantially 50,000 for the specific mixture flowing at the predetermined flow rate. Once a flow diameter is selected that satisfies both the maximum and minimum allowable sizes, a flow length can be chosen that is at least between approximately 100 and 140 times longer than the flow diameter. A similar calculation process can alternatively be performed for predetermined values of flow diameter and desired droplet size distribution, by solving for allowable minimum and maximum flow rates to achieve such distribution through the predetermined flow diameter. Again, the flow length should be at least approximately 100 to 140 times longer than the flow diameter, and the chosen flow rate should result in a Reynolds number of at least substantially 50,000.

According to the present invention, therefore, the droplet size distribution of the mixture flowing through the enclosed conduit is altered by the coalescing turbulent flow, resulting in a predetermined distribution of droplet sizes in the mixture discharged from the conduit. This predetermined distribution includes a greater percentage of larger droplets then were contained in the same mixture entering the conduit. In each succeeding section of the flume, the larger droplets are removed lowering the oil content. The remaining drops are coalesced to a larger size, if necessary, in the following passageway.

Figure 1:
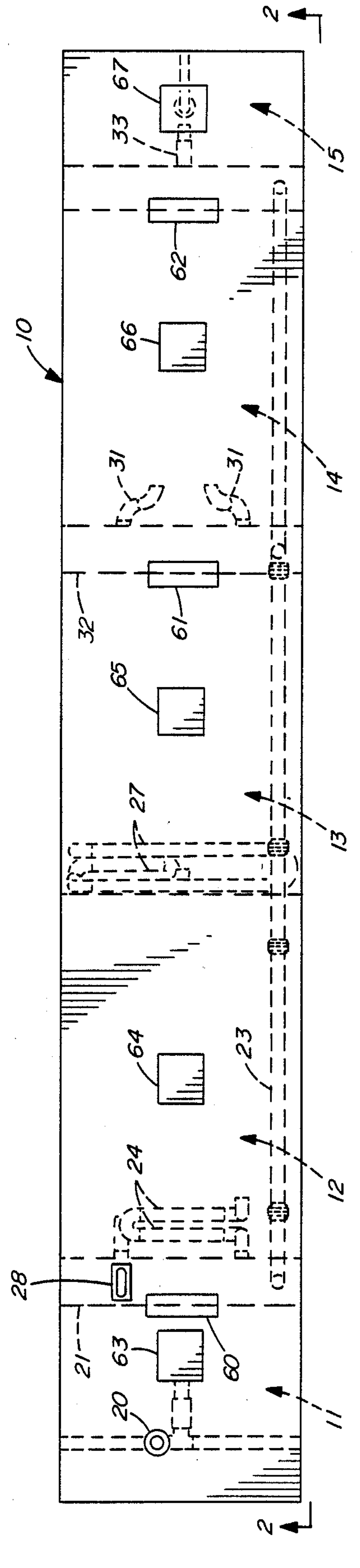
FIG. 1 is a plan view of a series coalescing flume incorporating the present invention.
Figure 2:
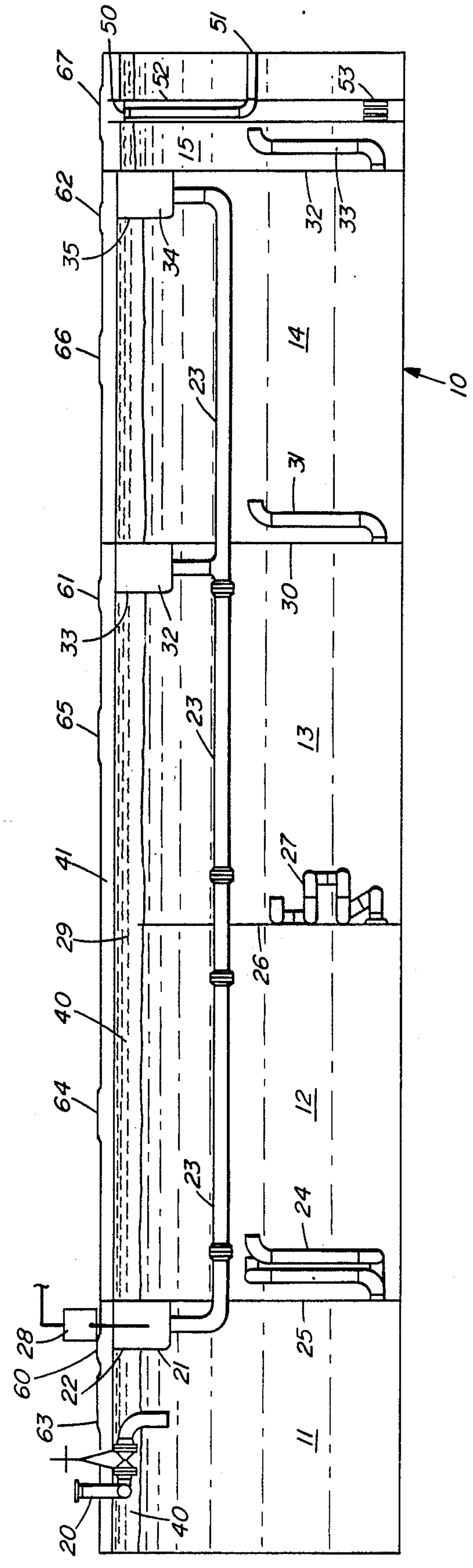
FIG. 2 is a longitudinal cross section of the flume shown in FIG. 1.

Referring to FIGS. 1 and 2, there is shown therein one embodiment of a flume built according to the present invention. Several flumes may be installed in parallel sharing an adjacent wall. The flume 10 is divided into separate compartments 11, 12, 13, 14 and 15 by a series of bulkheads 25, 26, 30 and 32. An inlet 20 communicates with the first settling compartment 11 wherein a substantial portion of the oil droplets of sufficient size, in accordance with Equation 1, will separate from the oil-water mixture and form an oil blanket 40 in the top of the compartment 11. The oil that separates from the oil-water mixture flows into a sump 21 that has an adjustable weir 22. The weir can be adjusted to maintain the proper thickness of oil blanket in the compartment. The oil is removed from the sump by means of a pump unit 28 and discharged to a holding tank or is mixed with the crude that is pipelined to another location.

The remaining oil-water mixture in the first settling compartment 11 is transferred to the second settling compartment 12 by means of enclosed conduit coalescing tubes 24. The tubes 24 provide coalescing turbulent flow in the flowing oil-water mixture that causes small oil droplets to coalesce and form larger droplets. A substantial portion of the larger droplets of sufficient size can then separate from the water in the settling compartment 12 and become part of the oil blanket 40 at the top of the compartments 11, 12, 13, 14. The two compartments 12 and 13 communicate with each other at the top through an opening 29 so that the oil that separates from the oil-water mixture in compartment 13 is collected in a sump 32. The sump 32 is provided with an adjustable weir 33 and is connected to the sump 21 by means of the longitudinal pipe 23. The settling compartment 12 is also connected to the settling compartment 13 by an enclosed conduit coalescing tube 27. The settling compartment 13 is connected to the final settling compartment 15 by a series of enclosed conduit coalescing tubes 31. The final settling compartment 15 is also provided with a sump tank 34 having an adjustable weir 35 and is connected to the sump tank 21 by the pipe 23. Several possible configurations of each enclosed conduit coalescing tubes are shown at 24, 27, 31 and 33, for example only.

Applicant has found that including a plurality of flow bends in the enclosed conduit coalescing tubes enhances the coalescence of oil droplets in the oil-water mixture flowing therethrough. Such flow bends cause repeated alternations of the direction of flow in the mixture flowing through the conduit. It is believed that such flow alternation increases the frequency of impact of oil particles, thus furthering coalescence. Such flow bends should be able to effect substantially 180-degree diversions of flow therethrough, for maximum benefit. Elements of a full 180 degree flow bend need not be contiguous, but can be separated for diverting flow. However, the best coalescence results have been obtained with at least eight alternating "runs" of straight pipe, assembled in a fashion similar to that shown in coalescing tube 27 in FIGS. 1 and 2. Hence, Applicant has determined that one embodiment of the present invention preferably should include at least four flow bends within the flow path. In addition, Applicant has found that more than seven flow bends do not appreciably improve coalescing performance of the enclosed conduit flow path for the purposes of the prevent invention.

The final settling compartment 14 is connected to the final settling compartment 15 by means of the enclosed conduit coalescing tube 33. The final settling compartment 15 is provided with a standpipe 52 having openings 53 at the bottom. Positioned in the standpipe 52 is an outlet 51 whose top 50 controls the level of liquid in the flume 10 in relation to the gas blanket 41. The flume 10 is provided with a series of access hatches 63, 64, 65 and 66 which permit entry to the various settling compartments 11, 12, 13, 14. Similarly, the flume 10 is provided with access hatches 60, 61, 62, and 67 which permit access to the adjustable weirs 22, 33, 35, and 50, respectively, for adjustment.

Figure 3:
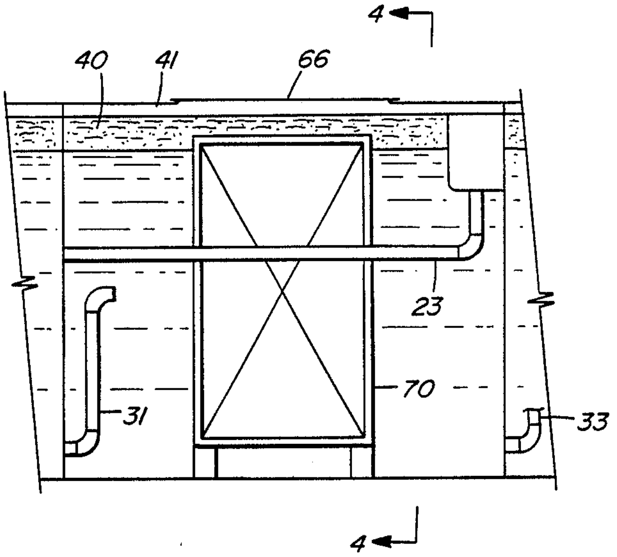
FIGS. 3 and 4 are longitudinal and end views, respectively, of a parallel plate interceptor which could be installed in a compartment in the flume of FIG. 1.
Figure 4:
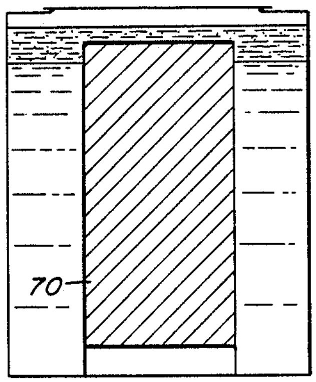

Referring to FIGS. 3 and 4, there is shown therein an alternative arrangement for the settling compartment 14 wherein a parallel plate separator 70 is installed in the compartment 14 to assist in separating the small oil droplets from the oil-water mixture flowing therethrough. The parallel plate separator may be of the design described in U.S. Pat. No. 3,346,122 although other designs can also be utilized. Such parallel plate separators are well known in the art and are commercially available and further discussion of the unit is not believed to be necessary.

Figure 5:
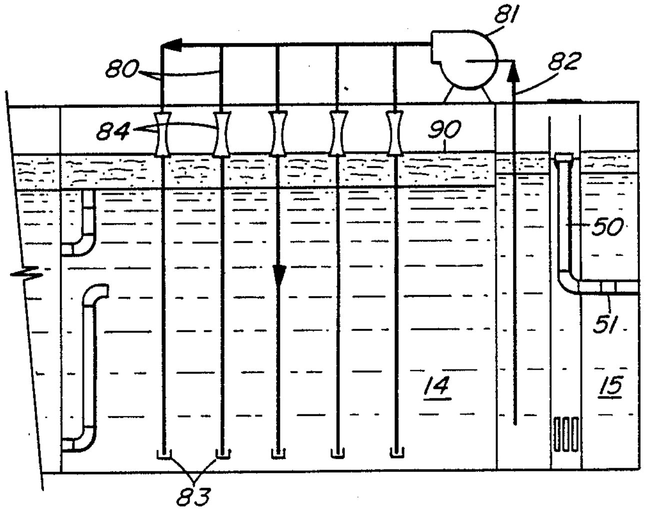
FIG. 5 is a cross section along line V—V of FIG. 1 showing installation of a gas flotation system in a compartment in the flume.

To further assist the separation of the oil from the oil-water mixture, a dispersed or dissolved gas flotation device may also be utilized in any compartment. The gas would normally be natural gas, although under certain conditions it may be desirable to use air or inert gases such as nitrogen. As shown in FIG. 5, a pump 81 draws fluid through a pipe 82 from the final settling compartment 15 and discharges it through a series of lines 80 that extend downwardly into the compartment 14. Each of the lines 80 contains a venturi 84 which draws gas from the gas blanket 41 into the line. Each of the lines 80 terminates in an open end adjacent the bottom of the compartment 14 and is provided with a U-shaped or cup-shaped member 83. The cup-shaped member 83 causes the flowing oil-water mixture to reverse and flow upwardly through the compartment, thus aerating or inducing gas into the oil-water mixture contained in the compartment 14.

Figure 6:
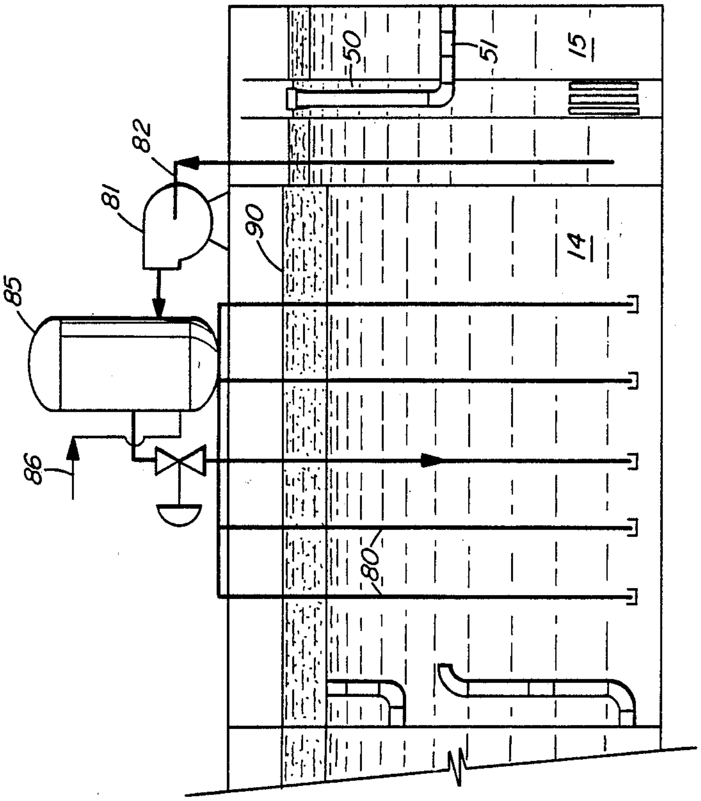
FIG. 6 is a longitudinal section along line V—V of FIG. 1 showing an alternate gas flotation system in a compartment in the flume.

An alternative arrangement to that shown in FIG. 5 is shown in FIG. 6 where high pressure gas is induced into the oil-water mixture. The gas can be supplied from a high pressure source 86 to the reservoir 85. Such dispersed gas and dissolved gas flotation devices are well known in the art and are commercially available and further discussion of the unit is not believed to be necessary.

When the induced gas or gas flotation systems are used it will be necessary to relocate the sump 34 shown in the compartment 14 so that it is positioned along the side of the compartment instead of athwartships as shown in FIGS. 1 and 2. For example, the sump and its weir can be positioned as shown by the adjustable weir 90 in FIGS. 5 and 6.

Figure 7:
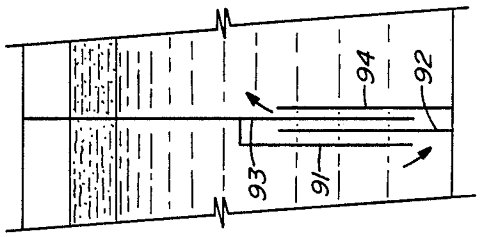
FIG. 7 shows an alternative coalescing means to those shown in FIGS. 1 and 2 for the flow between adjacent compartments.

Referring to FIG. 7, there is shown an alternative embodiment of an enclosed conduit tortuous path between the various settling compartments 11, 12, 13, 14, 15. In FIG. 7 a tortuous path is formed by the interwoven plate members 91, 92, 93 and 94. The proper positioning of plate members causes the oil-water mixture to flow under one plate and over the top of the next and thus through a tortuous path creating turbulence between the two compartments.

Figure 9:
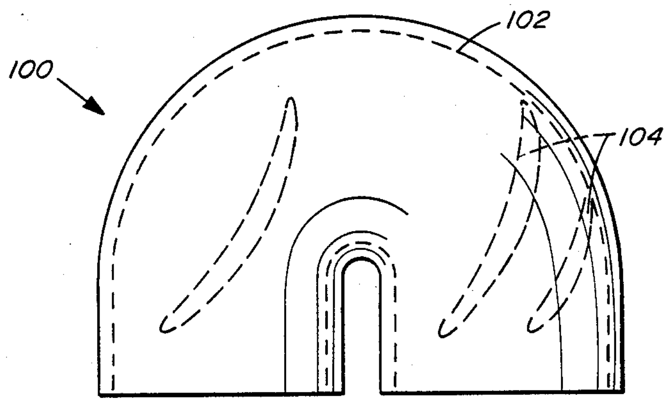
FIGS. 9 and 10 show elevational and plan views respectively of a vortical flow bend that can be utilized in an enclosed conduit coalescer shown in FIG. 1, in accordance with the present invention.
Figure 10:
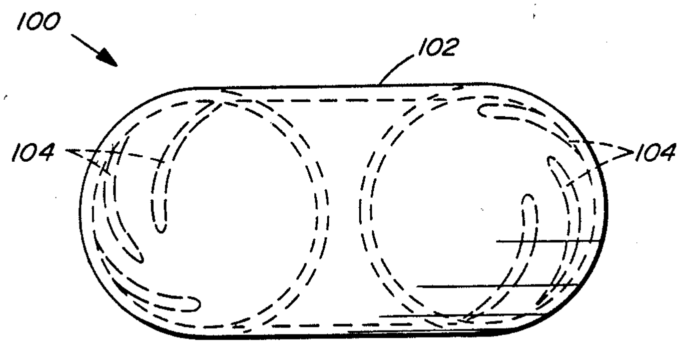

With reference to FIGS. 9 and 10, there is shown therein an alternative embodiment of a vortical flow bend 100 for use in an enclosed conduit flow path of the present invention. The vortical flow bend 100 shown is a 180-degree bend. The vortical flow bend has an exterior surface 102 into which are molded or formed spiraling grooves 104 that create vanes extending into the interior wall of the vortical flow bend 100. As fluid flows through the interior of vortical flow bend 100, a generally swirling, vortical flow is induced into the fluid. When the vortical flow bend 100 is included in an enclosed conduit flow path and an oil-water mixture flows therethrough in accordance with the present invention, the induced vortical flow aids in coalescing oil droplets within the mixture. The vortical flow bend 100, therefore, enhances the coalescence and separation process of the present invention. Any means for inducing such vortical flow within the conduit, therefore, would be considered equivalent to the spiraling groove, and is within the scope of the present invention.

Those skilled in the art will appreciate that the foregoing list of attributes and advantages is not exhaustive of the features of the present invention. It will be appreciated that modifications to the described preferred embodiments of the invention can be made without departing from the substance and spirit of the present invention. In particular, for example, the various compartments can be formed by lined pits that are connected to each other by enclosed conduit coalescing pipes. Moreover, the sump tanks may be separate structures placed in the pits or adjustable weirs may be used to isolate a portion of each pit to form the sump. Also, it may be necessary in some cases to cover the pits to form an effective gas blanket over the compartments.

What is claimed is:

1. A method for reducing the concentration of oil to no more than 72 milligrams of oil per liter in a mixture containing oil dispersed within a continuous water phase and flowing at a predetermined flow rate, by successively growing and removing droplets of oil larger than a predetermined size, comprising the steps of:

(a) providing an enclosed conduit having an inlet, an outlet, and a flow path disposed therebetween, the flow path having at least four flow bends able to effect substantially a 180-degree diversion of flow therethrough, and further having a flow diameter and a flow length, the flow length being at least approximately 100 times longer than the flow diameter and the flow diameter being small enough to induce turbulence in the mixture flowing therethrough at the predetermined flow rate, such turbulence, being characterized by a Reynolds number equal to al least substantially 50,000;

(b) providing a setting compartment of capacity sufficient for separating from the mixture a substantial portion of the droplets of oil larger than the predetermined size;

(c) flowing the mixture through the inlet of the enclosed conduit into the flow path at the predetermined flow rate;

(d) flowing the resulting mixture from the enclosed conduit into the sealing compartment;

(e) separating a substantial portion of the droplets of oil larger than the predetermined size from the remaining mixture contained within the settling compartment;

(f) discharging the remaining mixture from the settling compartment; and (g) repeating steps (a) through (f) as necessary to attain the desired concentration of no more that 72 milligrams of oil per liter of remaining mixture.

2. The method of claim 1, wherein the flow path includes not more than seven such flow bends.

3. The method of claim 1, wherein the enclosed conduit is formed by a series of plates configured to force fluid flowing therethrough to flow under then over one plate and then under then over the next plate.

4. The method of claim 1, wherein said flowing steps occur concurrently with said separating step.

5. The method of claim 1, wherein the flow diameter is not smaller than dictated by the following equation:

$$d_{95} = 0.725 \frac{1}{\epsilon^{2/5}} \left( \frac{\sigma}{\rho w} \right)^{3/5} \times 10^4$$

where:

$d_{95}$=the diameter of the predetermined oil droplet size;

$\epsilon$=mixing parameter for the mixture, equivalent to the work done on a fluid per unit mass per unit time, $cm^2/s^3$;

$\sigma$=surface tension of the mixture, dynes/cm; and $\rho_w$=density of the mixture, $g/cm^3$.

6. The method of claim 1, wherein one of the flow bends includes therein means for inducing vortical flow in fluid flowing therethrough.

7. The method of claim 6, wherein the flow bend has an interior surface therein, and the vortical flow inducing means includes a spiraling vane disposed on the interior surface.

8. A method for reducing the concentration of oil to no more than 72 milligrams of oil per liter in a mixture containing oil dispersed within a continuous water phase, by successively growing and removing droplets of oil larger than a predetermined size, comprising the steps of:

(a) providing an enclosed conduit having an inlet, an outlet, and a flow path disposed therebetween, the flow path having at least four flow bends each configured to effect substantially a 180-degree diversion of flow therethrough, and further having a predetermined flow diameter and a flow length at least approximately 100 times longer than the flow diameter;

(b) providing a setting compartment of capacity sufficient for separating from the mixture a substantial portion of the droplets of oil larger than the predetermined size;

(c) flowing the mixture through the inlet of the enclosed conduit into the flow path at a flow rate high enough to induce turbulence in the mixture inside the enclosed conduit, such turbulence being characterized by a Reynolds number equal to at least substantially 50,000;

(d) flowing the resulting mixture from the enclosed conduit into the settling compartment;

(e) separating a substantial portion of the droplets of oil larger than the predetermined size from the remaining mixture contained within the settling compartment;

(f) discharging the remaining mixture from the settling compartment; and (g) repeating steps (a) through (f) as necessary to attain the desired concentration of no more than 72 milligrams of oil per liter of remaining mixture.

9. The method of claim 8, wherein the flow path includes not more than seven such flow bends.

10. The method of claim 8, wherein the enclosed conduit is formed by a series of plates configured to force fluid flowing therethrough to flow under then over one plate and then under then over the next plate.

11. The method of claim 8, wherein said flowing steps occur concurrently with said separating step.

12. The method of claim 8, wherein the flow rate is not higher than dictated by the following equation:

$$d_{95} = 0.725 \frac{1}{\epsilon^{2/5}} \left( \frac{\sigma}{\rho w} \right)^{3/5} \times 10^4$$

where:

$d_{95}$=the diameter of the predetermined oil droplet size;

$\epsilon$=mixing parameter for the mixture, equivalent to the work done on a fluid per unit mass per unit time, $cm^2/s^3$;

$\sigma$=surface tension of the mixture, dynes/cm; and $\rho_w$=density of the mixture, $g/cm^3$.

13. A method for coalescing droplets of oil in a mixture containing oil dispersed within a continuous water phase thereby to enhance subsequent separation of the oil from the mixture to reduce the concentration of oil to no more than 72 milligrams of oil per liter of mixture, comprising the steps of:

(a) providing and enclosed conduit having an inlet, an outlet, and a flow path disposed therebetween, the flow path having at least four flow bends, each such flow bend being configured to effect substantially a 180-degree diversion of flow therethrough and the flow path further having a flow diameter and a flow length at least approximately 100 times longer than the flow diameter; and (b) flowing the mixture through the flow path at a flow rate great enough to induce turbulence in the mixture inside the enclosed conduit, such turbulence being characterized by a Reynolds number equal to at least substantially 50,000.

14. The method of claim 13, wherein one of the flow bends includes therein means for inducing vortical flow in fluid flowing therethrough.

15. The method of claim 14, wherein the flow bend has an interior surface therein and the vortical flow inducing means includes a spiraling vane disposed on the interior surface.

* * * * *

UNITED STATES PATENT AND TRADEMARK OFFICE
CERTIFICATE OF CORRECTION

PATENT NO. : 4,935,154

DATED : June 19, 1990

INVENTOR(S) : Kenneth E. Arnold

It is certified that error appears in the above-identified patent and that said Letters Patent is hereby corrected as shown below:

Column 3, line 63, delete the (":") between "oil" and "volume."

Column 8, line 56, claim 1, delete "setting" and insert therefor --settling--.

Column 8, line 64, claim 1, delete "sealing" and insert therefor --settling--.

Signed and Sealed this

Fifteenth Day of October, 1991

*Attest:*

HARRY F. MANBECK, JR.

*Attesting Officer*

*Commissioner of Patents and Trademarks*